July 21, 1959  A. E. FENTIMAN  2,895,753
JOINT

Filed Jan. 18, 1956  2 Sheets-Sheet 1

Inventor
ARTHUR E. FENTIMAN
Attorney

July 21, 1959  A. E. FENTIMAN  2,895,753
JOINT

Filed Jan. 18, 1956  2 Sheets-Sheet 2

Inventor
ARTHUR E. FENTIMAN
Attorney

United States Patent Office 2,895,753
Patented July 21, 1959

2,895,753

JOINT

Arthur E. Fentiman, Ottawa, Ontario, Canada, assignor to F. Fentiman & Sons, Ltd., Ottawa, Ontario, Canada Application January 18, 1956, Serial No. 560,027

10 Claims. (Cl. 287—20.3)

This invention relates to joints and the method of making the same designed for use in the fabrication of many units entering into various forms of structures, and is a continuation-in-part of applications S.N. 450,717, "Structural Framework" and S.N. 487,514, "Truss and Components Therefor."

In the past decade great progress has been made in the development and use of new materials such as plastics, alloys and the like and many articles are now made for these new materials, and successfully used in building and other allied arts.

In developing my invention it was necessary to consider its application not only to metal structures but also to other materials which may enter into the fabrication of units suitable for use in the building art, and it will be clear that my invention is not to be restricted to metal joints but applies to a larger field in which joints of other materials find use.

In developing the present invention the building art has been carefully studied and while metal threaded joints and clamps and nuts and bolts have been and are being used with a certain amount of success, in scaffolding and other similar structures, they are subject to many objections.

Ferrous metals enter very largely into the building art, as for instance, in the fabrication of roof principals, and conventional threaded units such as couplings, knees or bends, T-pieces etc., are commonly used in construction work, but the making and assembling of such units is time consuming and necessitates the use of skilled labour which adds to construction costs.

In a threaded joint, part of the inner and/or the outer periphery of the co-acting members is removed in cutting the thread, with the result that the effective area of the metal at the joint is materially reduced. If therefor a threaded tubular joint is to be made of a specified strength it usually requires that the tubular body part must be oversize so that the relatively smaller threaded portion of the tube will have the required cross sectional area to provide the desired strength. When solid rods are used the ends could be upset and threaded so that the body of the rods would not require to be increased, but this too is a costly operation.

As the cross sectional area of tubular units located between the threaded ends increases with the square of the diameter of the unit, it will be clear that the weight of the structure will increase very rapidly. Such an increase in weight usually requires that the supporting units for such a structure will have to be proportionately strong and heavily constructed to carry the load.

This question of weight of a structure proportionate to size may be of great importance if the structure is of a knockdown form and has to be shipped by air to outlying places for erection.

Structures formed of ferrous metal have been successfully used in building structures but unfortunately ferrous metal rusts and deteriorates when exposed to the atmosphere, and if the air is contaminated with acid fumes, as it frequently is in industrial areas, then the deterioration is hastened.

The cutting of threads in the outer periphery of a ferrous tube makes a place of discontinuity of the peripheral metal of the tube, and the sharp indentations of the cut thread constitutes a place of weakness, particularly when the tube is submitted to a movement of contra-flexure.

Moreover when building frames are formed of threaded tubular parts, it is difficult to remove a defective or fractured threaded tube and replace it with a sound tube without submitting the frame to stresses and strains seldom contemplated when designing or fabricating the frames.

These were a few of the disadvantages with which I was confronted when making my invention, and the conclusion reached was that threaded joints, as we know them, are not always successful when used in the fabrication of building frames or structures.

In seeking a solution of a form of joint it was realized that the joint must not only form the connecting means of the members of a single firm frame, but that provision must be made for connecting thereto other firm frames so that polygonal frames of various forms may be built up possessing great strength and when desired lightness of weight.

The joint may consequently be constructed of any desired metal suitable for the purpose for which it is intended, but the joint may also be constructed of synthetic materials or other non-metallic materials when such may be advantageously employed.

In the selection of materials for making a joint this would be governed by the purpose for which the joint is to be used, and if lightness and strength were required then some of the alloys of the lighter metals may be used to advantage.

In bringing my invention to a successful conclusion and reduction to practice certain objects had to be fulfilled.

One of the objects of my invention is to construct a joint which is easily assembled and easy to take apart, and permits of the removal of a defective unit and the insertion of a replacement part without subjecting the structure of which the joint forms an essential part, to undue stress or strain.

A further object is to construct a joint of a central hub and co-operating radial members, so that the resistance to shear of the members of the joint will effectively withstand tensile stress applied to the radial members, which stress might otherwise tend to impair the joint.

Another object is to provide a radial member of the joint with an end that is at least partially flat and which may be laterally inserted and driven into a longitudinally extending keyway in a hub.

Still a further object is to form the partially flattened end of a radial member of a joint so that the resiliency of the material forming the member will press the flattened portion into intimate contact with the walls of a keyway in a hub.

Still another object is to provide a keyway of a hub and a partially flattened end of a radial member of a joint with co-acting projections in which the resistance of the material of the joint to shear is distributed over the engaging projections in the best manner to resist any tensile stress applied to the radial member.

A further object is to press the end of a radial member of a joint into a flattened shape with the flattened walls slightly spaced apart and retaining the resiliency of the material in the flattened end.

A further object is to press the end of a radial member of a joint into a partially flattened shape and to form projections thereon by flowing the material of the member into the projections without cutting or fracturing the outer peripheral wall of the member and so retaining a maximum tensile strength in the radial member.

Another object is to develop a joint which will retain to a maximum the tensile strength of the materials used in the parts constituting the joint so that the completed joint will have the highest possible efficiency.

Further objects will be made clear as the specification proceeds.

The above objects are obtainable by forming a joint of a hub provided with radial arranged keyways which extend longitudinally of the hub and fitting axially thereinto radial members, the ends of which are partially flattened to frictionally engage the keyway.

The displacement of the radial members when subjected to longitudinal pull is prevented by providing means which will engage and interlock between the lateral walls of the keyway and the radial members and distributing the resistance to shearing over the members of the joint in a manner progressively increasing in force from the periphery of the hub to the root of the keyway.

So that the nature of my invention may be more clearly understood, I have illustrated and described in detail one embodiment of the same, but it must be understood that I do not restrict my invention to this specific form or method now described but reserve the right to make modifications within the scope of my appended claims.

Figure 3:
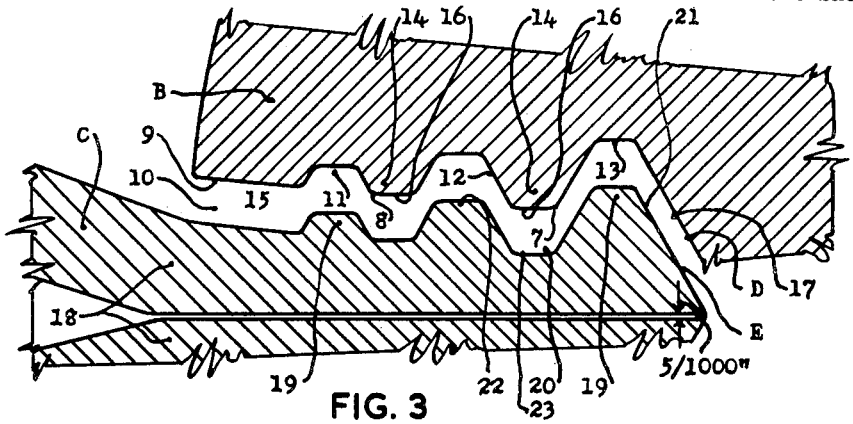

Figure 3 is a similarly enlarged sectional detail of the joint showing the disposition of the recesses and ribs of one of the lateral walls of a keyway and the arrangement of the ribs and recesses of one of the walls of the radial member, the two members being slightly spaced apart to show the complemental arrangement of the ribs and recesses of one member relatively to the recesses and ribs of the other member.

Figure 4:
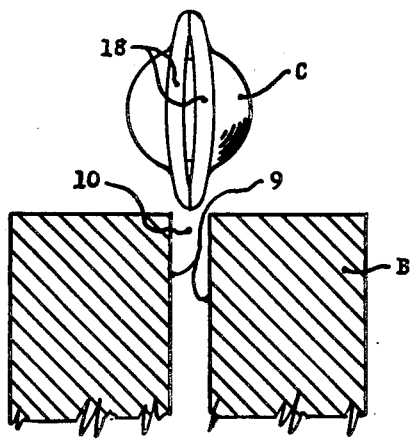

Figure 4 is an enlarged end elevation of the flattened end of a radial member showing the convex shape of the said end with its slightly spaced arcuate walls before engagement with a keyway in the hub.

Figure 1:
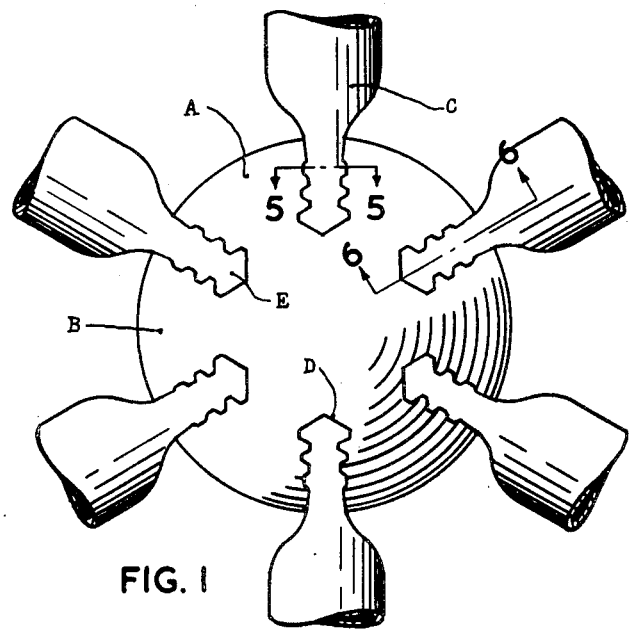
Figure 1 is an end elevation of a hub and a plurality of radial members connected therewith.
Figure 5:
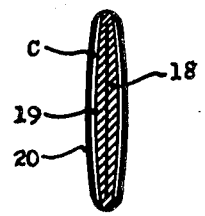

Figure 5 is an enlarged section of the flattened end of a radial member showing the slight arcuate or convex shape of the walls of the flattened end as compressed in a keyway of the hub, as taken on the line 5—5 of Figure 1 and looking in the direction of the arrows.

Figure 6:
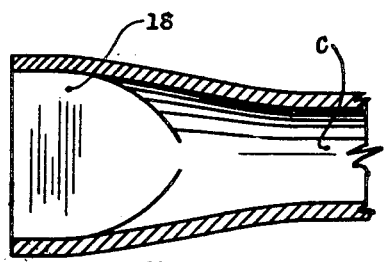

Figure 6 is a vertical longitudinal section of the end of a radial member showing the narrow, heightened space between the partially flattened walls of the member, as taken on the line 6—6 of Figure 1 and looking in the direction of the arrows.

Like characters of reference refer to like parts in the several figures.

Referring to the drawings, A represents a joint comprising a hub B and a radial member such as the tube C which may be made of an extruded metal. The hub B is formed with a plurality of radially disposed keyways which extend longitudinally through the length of the hub (i.e.) from end to end. The number of keyways will depend on the use to which the joint is to be put and in the embodiment illustrated six keyways are arranged equidistantly spaced around the hub.

The lateral walls 9 of the keyway 10 taper towards the bottom of the keyway, and these walls are formed with a plurality of spaced longitudinally extending recesses 11 the side walls 12 of which are angularly disposed and diverge towards the central longitudinal axial plane of the keyway. The inner wall 13 of these recesses 11 is flat, forming a plane surface of rectangular shape.

Ribs 14 located between the recesses 11 are formed by the angularly disposed side walls 12 and the crests 16 of these ribs adjacent the centre plane of the keyway are flat and form plane surfaces of rectangular shape.

At the bottom of the keyway the angularly disposed walls of the recesses 11 converge as shown at 17.

Figure 2:
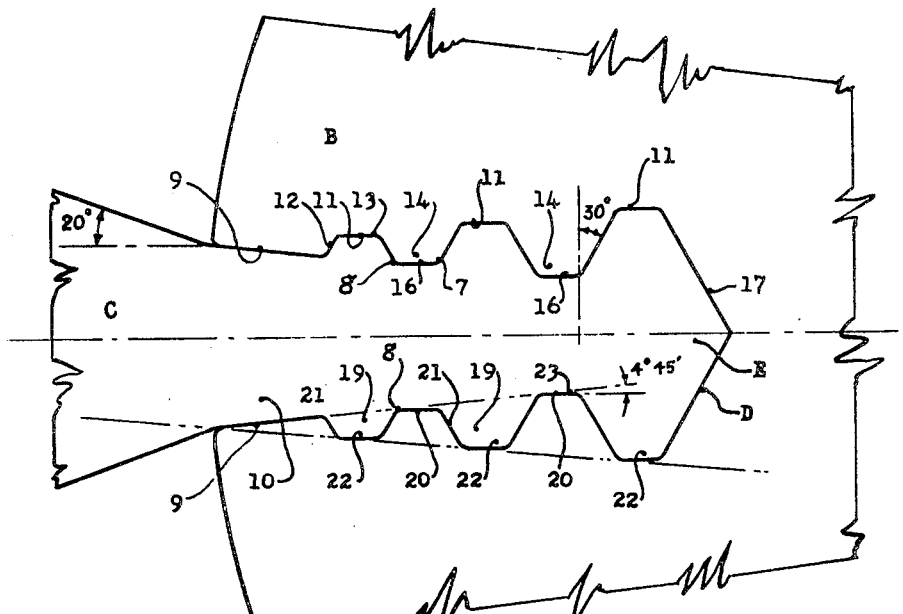
Figure 2 is an enlarged detailed end elevation of the joint when assembled.

By reference to Figure 2 of the drawings, it will be seen that the angular edge 8 of the crests 16 of the ribs 14 lie in the plane of the taper of the lateral walls 9 of the keyway 10, and that the angular edges 7 of these crests lie behind this plane, so that the wall of the crest 16 is thus disposed transversely at an angle of approximately 4 deg. 45 min. behind the plane of the normal lateral walls of the keyway. The inner walls 13 of the recesses 11 are disposed at a similar angle as the crests of the ribs.

The size and depth of the recesses 11 progressively increase from adjacent the periphery of the hub B to the bottom of the keyway 10, and the size and height of the ribs 14 likewise progressively increase from adjacent the peripheral end of the keyway 10 to the bottom of the keyway.

This increase in the size and depth of the recesses and the size and height of the ribs cause the keyways 10 to assume a dovetail form in profile below the throat 15 of the keyway.

This form of keyway is not to be confused with an ordinary dovetail, in that it differs therefrom by providing a greater contacting area and provides a better angular engagement of the contacting parts of the joint.

The bottom of the keyway 10 simulates an enlarged irregular hexagon D, the side walls of which are shorter than the other walls.

The radial member C is illustrated as a tube, and a short length of the end of the tube is flattened by dies and the flattened walls 18 while in close proximity do not actually contact each other as there is a space of approximately five one thousandths of an inch between the flattened walls, and this permits the walls to be pressed into closer contact but the walls recover from any deformation by the resiliency of the metal forming the walls tending to return the walls to their spaced relationship under circumstances which I shall describe later.

The walls 18 are slightly arcuate or convex in cross section and the solid edges of the flattened walls are slightly tapered and this facilitates entering the edge of the flattened end of the tube C into the end of a keyway 10 when assembling a joint.

The flattening of the walls 18 of the end of the tube C is very important as the ribs 19 are formed by the displacement of the metal which flows from the recesses 20 to the crests of the ribs 19 which are flat at the crests and the recesses are correspondingly formed so that they need not be too deep to give this required shape to the ribs. The pressing of the end of the tube C (which is drawn tubing) is across the grain of the metal of the tube and as the metal of the periphery of the tube is not cut but merely displaced the grain is not impaired but only slightly displaced and elongated so that the tensile strength of the tube is maintained. As will be observed the displacement of metal from the recesses to the crests of the ribs gives an overall thickness to the crests which is considerably greater than the thickness of the tube walls. After this cold working of the tube end during the flattening process, the tube is heat treated and aged, and tests have shown that the strength of the tube has not been impaired but has been maintained.

The ribs 19 and the recesses 20 progressively increase in size towards the bottom end of the flattened walls 18 so that in profile this flattened end resembles a dovetail. The lateral walls 21 of each rib 19 are angularly disposed to the face of the flattened portion 18 of the tube C and these walls converge outwardly to the crests 22 which is substantially rectangular in shape. The recesses 20 between the ribs 19 are bounded by the angularly disposed lateral walls 21 which diverge, and the inner or bottom wall 23 of each recess is substantially of rectangular shape.

The crest 22 of the ribs 19 and the bottom wall 23 of the recesses 20 are angularly disposed at an angle similar to the bottom walls 13 of the recesses 11 and the crests 16 of the ribs 14, so that the ribs and recesses on the end of the tube C are complemental to the recesses 11 and ribs 14 in the side walls 9 of the keyway 10. The flattened walls 18 of the tube C terminate in an enlarged end E similar in shape to the enlarged inner end D of the keyway 10, i.e. this enlarged end E simulates an irregular hexagon.

The tapered edge of the flattened end of the tube C is inserted edgewise into the end of the keyway 10, as shown schematically in Figure 4, and then the flattened end is driven into engagement with the keyway throughout the entire width of the flattened end. Since the walls 18 of the flattened end of the tube C are slightly convex and are also slightly spaced apart these walls are pressed towards each other when the joint is assembled, and the resiliency of the metal holds the walls 18 and the ribs 19 and recesses 20 in intimate contact with the walls 9 and the recesses 11 and ribs 14 of the keyway 10 but this pressure on the walls 18 does not make any permanent distortion on the flattened end of the tube C since the walls return to, or assume their convex shape when the flattened end of the tube C is disengaged from the keyway 10.

It will be clear that the engagement of the walls, the ribs and recesses are a combination of resilient and frictional contact and that the co-acting recesses and ribs engage each other along their angularly disposed lateral walls so that these contacts are over inclined planes.

When an axial pull is exerted on the tube C separation of the joint A is resisted by the inclined planes formed by the angular disposition of the aforesaid lateral walls of the ribs and recesses which play a very important part in this matter. In this wise the force will be over these inclined planes and may be resolved into two components, viz., a force normally at right angles to the walls of the keyway which force is resisted by the walls of the keyway, and a second shearing force which is outward or radial in direction.

The longitudinal pull on the tube C is overcome by the resistance to shear of the ribs 11 on the walls 9 of the keyway 10, and the ribs 19 on the walls 18 on the flattened end of the tube C.

This resistance will be greatest at the root of the keyway 10 where the enlarged end E of the flattened end of the tube C engages the inclined wall of the bottommost rib 11 and this resistance gradually diminishes towards the peripheral end of the keyway as the gradually diminishing ribs engage each other.

It is to provide a proper distribution of this resistance to shear that the recesses and ribs of the keyway 10 and the recesses and ribs of the flattened walls 18 of the tube C increase in size from the periphery of the hub to the bottom of the keyway.

The number of ribs and recesses in the walls 9 of a keyway 10 and the flattened walls 18 of a tube C will depend on the specific use to which the joint may be put, and while for small joints there will be at least two ribs and recesses used on each side wall of a keyway and a similar number of recesses and ribs on the flattened end of a tube C, this number will be increased on larger types of joints when such is found desirable or necessary. The reference to a plurality of recesses and ribs as used throughout the specification must be interpreted in the sense set out above.

In the embodiment of the invention which I have illustrated I have found that by arranging the lateral walls of the recesses and ribs at an angle of approximately 30° and graduating the size of these recesses and ribs, that the resisting force to shear can be advantageously allocated as follows: approximately 15% near the periphery of the hub, about 25% midway of the depth of the keyway and 60% at the root of the keyway.

This distribution was arrived at after considerable study and innumerable tests of the joint, in which the lateral walls of the ribs and recesses were varied from a right angle to an acute angle. This angle of 30° as illustrated in the drawings may be varied very slightly if so desired. It will be noted that all the walls between the recesses and ribs are filleted or rounded at their line of junction, and the tube merges into the flattened end at an acute angle of approximately 26° thus eliminating any sharp angles.

When fashioning my joint and describing it I have referred to the radial member as a metal tube which may be an alloy of one of the lighter metals which have a grain structure suitable for the purpose, and after pressing the ends of the tube C to the desired shape I submit these tubes C to a heat treatment and ageing which give beneficial results before they are assembled into the joint. This type of joint however can be used with ferrous metals but in this case I submit the ends of the tubes to flattening when hot, and the ends may be annealed and aged before assembling the joint. Preferably the materials used in the making of these joints have an inherent resiliency which is retained even in the flattening of the tubular members so that it is contributory in the making of a strong tight joint. The joint has wide uses and may be constructed of non-metallic materials if and when desired. Additionally, when desired, the radial members may be solid and of other than tubular cross section.

The members of the joint are easily assembled and after the edge of the flat end of the radial tube is inserted in the end of the keyway it may be driven into position to complete the joint.

This assembly entails only the use of a hammer, so that skilled labour is not essential for this operation, and the joint may be taken apart with the same ease by simply striking the radial or tubular member with a hammer in a line paralleling the axis of the hub to disengage it from the end of the keyway.

Having thus described the invention, what is claimed as new is:

1. A joint comprising a hub formed with a radially disposed tapered keyway extending the length of the hub and open at both ends and having longitudinally extending recesses in the lateral walls of the keyway, ribs between the recesses, a tube with a flattened end having a space between the walls of the flattened end, transverse ribs on the outer walls of the flattened end of the tube, recesses between the last said ribs, the ribs and recesses of the flattened end of the tube frictionally and resiliently engaging complemental recesses and ribs on the lateral walls of the keyway.

2. The joint claimed in claim 1 in which the walls of the flattened end of the tube are formed slightly convex, with the outer peripheral wall of the tube continuous and unbroken over the entire outer surface of the flattened end.

3. The joint claimed in claim 1 in which the median normal width of the spaced convex walls of the flattened end of the tube exceeds the width of the keyway before engagement with the keyway.

4. The joint claimed in claim 1 in which the edges of the convex walls of the flattened end of the tube are tapered outwardly to facilitate the entry of the flattened end of the tube into the end of the keyway.

5. The joint claimed in claim 1 in which the ribs and recesses in the lateral walls of the keyway and the recesses and ribs on the flattened end of the tube are provided with angularly disposed lateral walls.

6. The joint claimed in claim 1 in which the recesses and ribs on the lateral walls of the keyway progressively increase in size towards the bottom of the keyway and the ribs and recesses on the walls of the flattened end of the tube correspondingly increase in size towards the end of the flattened portion of the tube.

7. The joint claimed in claim 1 in which the tapered keyway is constricted adjacent the periphery of the hub and the recesses and ribs in the lateral walls of the keyway form a dovetail below the constriction, and the ribs and recesses on the walls of the flattened end of the tube form a dovetail which complements the dovetail in the lateral walls of the keyway.

8. A joint comprising a hub formed with at least one keyway extending longitudinally thereof and open at both ends having radially inwardly tapering lateral walls, locking means formed in the walls and located behind the plane of the tapered walls and forming a constricted throat adjacent the upper end of the keyway and forming a substantial dovetail below the constricted throat, a radial member having a flat end and locking means projecting from the lateral walls of the flat end forming a dovetail and in complemental self-locking engagement with the first said locking means when the flat end is in engagement with the keyway, the flat end of the radial member being insertable into the keyway from either end of the hub.

9. A separable frictional joint comprising a hub formed with a radially disposed tapered keyway extending the length of the hub and having longitudinally extending recesses in the lateral walls of the keyway, the inner faces of the recesses lying in the same plane, ribs between the recesses having their crests lying in the same plane, a tube with a flattened end having a space between the walls of the flattened end, transverse ribs on the outer walls of the flattened end of the tube, the crests of the tube end ribs lying in the same plane, recesses between the last said ribs, the inner wall of the last said recesses lying in the same plane, the ribs and the recesses of the flattened end of the tube frictionally and resiliently engaging complemental recesses and ribs on the lateral walls of the keyway.

10. The joint claimed in claim 9 in which the lateral walls of the recesses in the hub flare towards the median line of the keyway, and the lateral walls of the ribs on the flattened end of the tube taper towards the crest of the rib to intimately engage the flared walls of the recesses in the hub.

References Cited in the file of this patent

UNITED STATES PATENTS

| | | |
|---|---|---|
| 384,449 | Kelsey | June 12, 1888 |
| 1,026,845 | Bishop | May 21, 1912 |
| 1,157,103 | Hart | Oct. 19, 1915 |
| 1,316,688 | Conrad | Sept. 23, 1919 |
| 2,050,993 | Bush | Aug. 11, 1936 |
| 2,142,896 | Harman | Jan. 3, 1939 |